(12) United States Patent
Pandit

(10) Patent No.: US 8,807,963 B1
(45) Date of Patent: Aug. 19, 2014

(54) WAVE POWERED ENERGY CONVERSION SYSTEM

(76) Inventor: Sudhir Pandit, Amity, AR (US)

( * ) Notice: Subject to any disclaimer, the term of this patent is extended or adjusted under 35 U.S.C. 154(b) by 173 days.

(21) Appl. No.: 13/589,672

(22) Filed: Aug. 20, 2012

(51) Int. Cl.
*H02P 9/04* (2006.01)
*F03B 13/18* (2006.01)

(52) U.S. Cl.
CPC .............. *F03B 13/187* (2013.01); *Y02E 10/38* (2013.01)
USPC ............................................ 417/331; 290/53

(58) Field of Classification Search
CPC .......... F03B 13/12; F03B 13/16; F03B 13/18; F03B 13/20; F03B 13/22; F03B 13/24; F03B 13/26; F04B 17/00; F04B 35/00; F04B 35/18
USPC ................. 417/244, 254, 330, 331, 332, 333; 290/42.53, 54, 42, 53
See application file for complete search history.

(56) References Cited

U.S. PATENT DOCUMENTS

| | | | | |
|---|---|---|---|---|
| 1,018,678 A | * | 2/1912 | Nelson | 290/4 D |
| 4,013,382 A | * | 3/1977 | Diggs | 417/332 |
| 4,105,368 A | * | 8/1978 | Waters | 417/53 |
| 4,281,257 A | * | 7/1981 | Testa et al. | 290/42 |
| 4,661,716 A | * | 4/1987 | Chu | 290/53 |
| 4,792,290 A | * | 12/1988 | Berg | 417/332 |
| 7,468,563 B2 | * | 12/2008 | Torch | 290/42 |
| 7,808,120 B2 | * | 10/2010 | Smith | 290/42 |
| 2010/0038913 A1 | * | 2/2010 | Svelund | 290/53 |
| 2011/0042954 A1 | * | 2/2011 | Werjefelt | 290/53 |

* cited by examiner

*Primary Examiner* — Devon Kramer
*Assistant Examiner* — Jon Hoffman
(74) *Attorney, Agent, or Firm* — Gulf Coast Intellectual Property Group

(57) ABSTRACT

A wave powered energy conversion system operable to convert the motion of ocean waves into a usable form of energy such as electricity. The wave powered energy conversion system includes a storage tank operable to store air pressurized to a pressure greater than that of atmospheric air. A frame assembly circumferentially surrounds the storage tank and consists of sub-frame assemblies organized into quadrants. The frame assembly is movable and has operably coupled thereto a plurality of buoyant objects. A plurality of air pumps are present that are connected to the frame assembly and further connected to an air delivery pipe network. The buoyant objects are operable to move at least a portion of the frame assembly so as to operate at least a portion of the plurality of air pumps so as to produce pressurized air to be distributed to the storage tank.

13 Claims, 4 Drawing Sheets

WAVE POWERED ENERGY CONVERSION SYSTEM

FIELD OF THE INVENTION

The present invention relates generally to energy production devices, more specifically but not by way of limitation, an energy production device that captures the motion of ocean waves and converts that motion into a usable energy form.

BACKGROUND

Global demand for energy is increasing year after year. Despite recent economic stagnation in various parts of the world, energy consumption and the requirement for more alternative sources of energy has increased. The increased demand for conventional energy sources such as but not limited to oil, has placed an increased focus on generating energy from alternative sources. Alternative energy sources such as wind and solar have been developed but are struggling to be commercialized and achieve market penetration due to issues such as but not limited to high component cost.

Alternative energy sources such as wind and solar have additional shortcomings that have limited the use of these energy sources. Solar technology has yet to develop the needed capacity to operate anything but small devices without the need for a significant amount of photovoltaic cells, which create logistic, and many other issues for implementation. Wind power generation has garnered negative social feedback, as many residents do not want wind farms in their area due to noise levels and aesthetic concerns.

Hydro powered devices have been utilized for many years but with limited exposure. It is well known that river dams are equipped with hydroelectric equipment and have successfully generated power for decades. While river currents and the manipulation thereof have been utilized to generate power, there has been minimal attempt to harness the power of the ocean in order to create a sustainable source of power. Approximately 38% of the population lives within 100 km of a coast. The ocean consistently generates energy in the form of tides and waves as a result of gravity and other atmospheric conditions. The undulating motion of the waves and the virtual consistent presence thereof represents a significant opportunity to transform that energy into a usable energy source such as but not limited to electricity.

Accordingly, there is a need for an apparatus that can convert the undulating motion of ocean waves into a usable energy form that can be subsequently distributed to communities proximate the coastal regions and beyond.

SUMMARY OF THE INVENTION

It is the object of the present invention to provide a power generation device that converts the energy in ocean waves into a usable energy source.

Another object of the present invention is to provide a power generation device that converts the energy of ocean waves into a usable source that utilizes a network of buoyant objects operable to engage waves of various heights.

A further object of the present invention is to provide a device operable to convert the energy of ocean waves into a usable form of energy wherein the network of buoyant objects are operably coupled to a framework of support rods.

Still a further object of the present invention is to provide an apparatus that converts the motion of ocean waves into a usable energy source wherein the framework of support rods are configured in multiple levels.

An additional object of the present invention is to provide an apparatus that converts the undulating motion of ocean waves into a usable energy wherein the buoyant objects are operably coupled to air pumps having pistons that are disposed within cylinders that generate air pressure as the buoyant objects move in an upwards-downwards motion.

Yet a further object of the present invention is to provide an apparatus that converts ocean wave motion into a usable energy form that collects the air pressure generated by the air pumps into a central storage tank.

Another object of the present invention is to provide an apparatus that converts the undulating motion of ocean waves into a usable energy form that includes an additional air storage tank located onshore that is operably coupled to a pneumatic generator, air driven turbine or other device operable to convert air pressure into a energy source such as but not limited to electricity.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
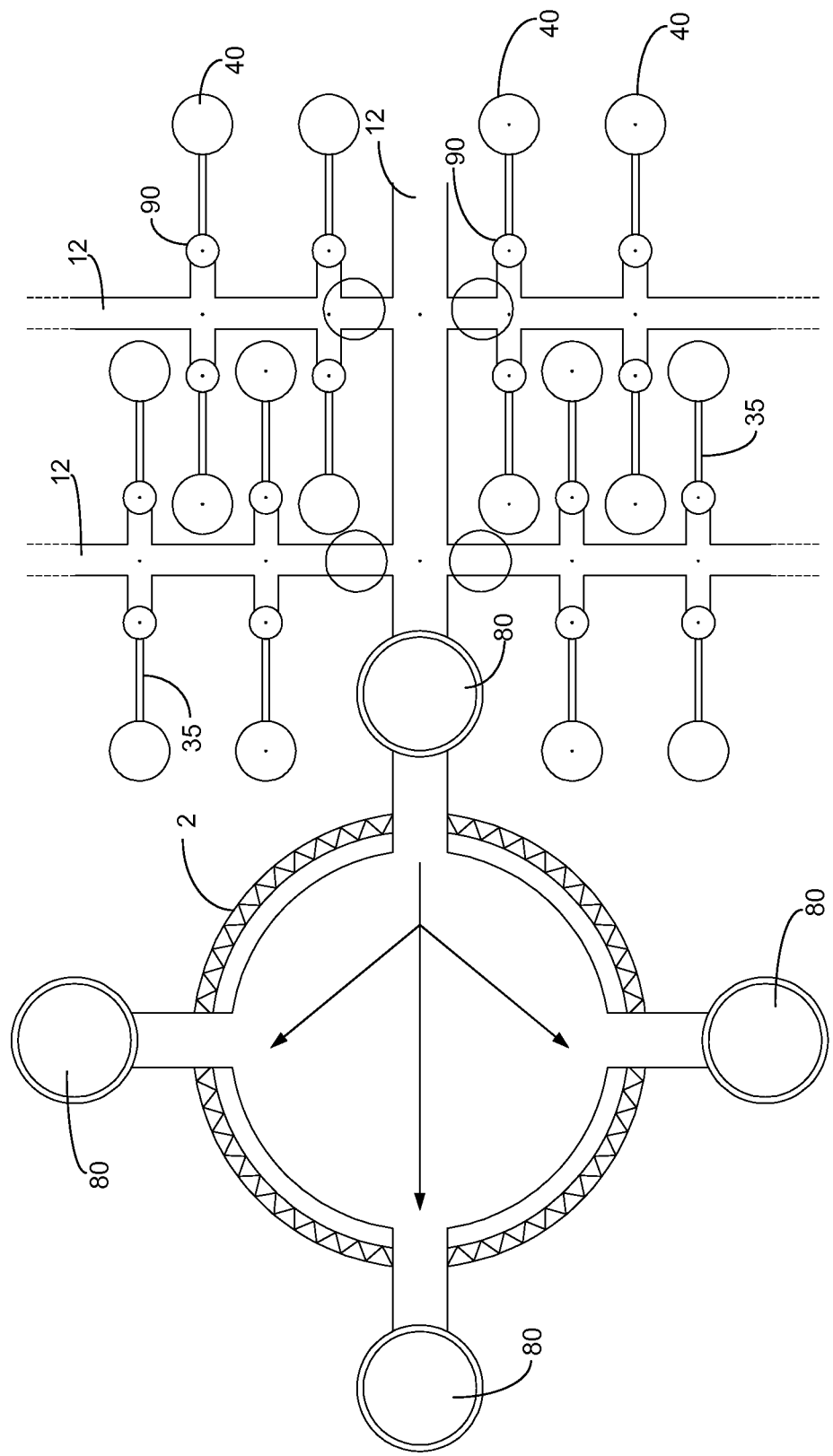
FIG. 1 is a schematic top view of an embodiment of the present invention.

Referring now to the drawings submitted herewith, wherein various elements depicted therein are not necessarily drawn to scale and wherein through the views and figures like elements are referenced with identical reference numerals, there is illustrated a wave powered energy conversion system 100 constructed according to the principles of the present invention.

Figure 4:
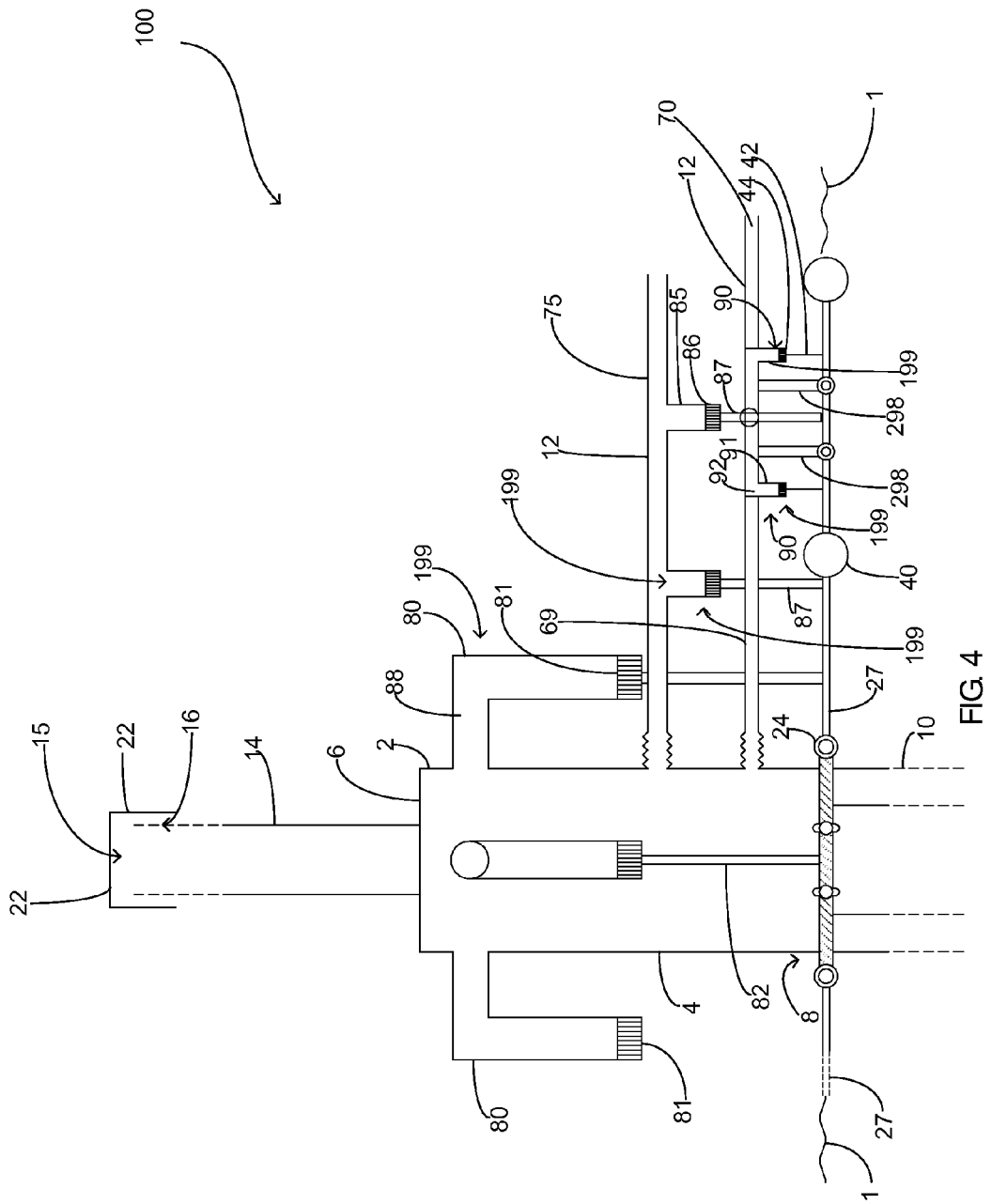
FIG. 4 is a schematic side view of an embodiment of the present invention.

Referring in particular to FIG. 4, the wave powered energy conversion system 100 further includes a tank 2 having at least one wall 4, top 6 and a bottom 8 operable to form an interior volume. The tank 2 is manufactured from a suitable durable material such as but not limited to aluminum and functions to store pressurized air therein. Pressurized air is introduced into the tank 2 via a network of air collection pipes 12 as discussed herein. The tank 2 is equipped with conventional pneumatic valves and is constructed so as to maintain a pressure therein that is greater than that of atmospheric pressure. The tank 2 is operably coupled to support posts 10 which are driven into the sea floor utilizing suitable techniques to provide stability for the wave powered energy conversion system 100. The support posts 10 are generally cylindrical in shape and constructed of a suitable durable material such as metal. It is contemplated within the scope of the present invention that any number of support posts 10 could be utilized to support the tank 2. Superposed the tank 2 and integrally secured thereto is an air tower 14 that is generally modified cylindrical in shape having an opening 15 proximate the top 16. The air tower 14 is secured to the tank 2 utilizing suitable techniques and functions to supply air to the network of air supply pipes 18 (discussed further herein). While not illustrated herein, the air tower 14 and thus the main air supply pipe 20, are pneumatically isolated from the interior volume of the tank 2 proximate the top 6 of the tank 2 utilizing conventional isolation construction techniques and/or valves. The pneumatic isolation functions to allow the air supply pipes 18 to have introduced thereinto a constant supply of air while maintaining the tank 2 can be pressurized to a desired air pressure. Those skilled in the art will recognize that the air tower 14 could be pneumatically isolated utilizing numerous different techniques and/or valving. Proximate the top 16 of the air tower 14 is cover 22. The cover 22 is suspendly mounted utilizing conventional techniques over the opening 15 so as to substantially inhibit rain or ocean water from entering the opening 15. While no height for the air tower 14 is required it is contemplated within the scope of the present invention that the air tower 14 extends above the water level 1 so as to substantially avoid any water entry from wave splashes or the like. While the tank 2 and air tower 14 are illustrated as having a particular shape in the drawings submitted herewith, it is contemplated within the scope of the present invention that the tank 2 and air tower 14 could be manufactured in numerous different sizes and shapes.

Figure 2:
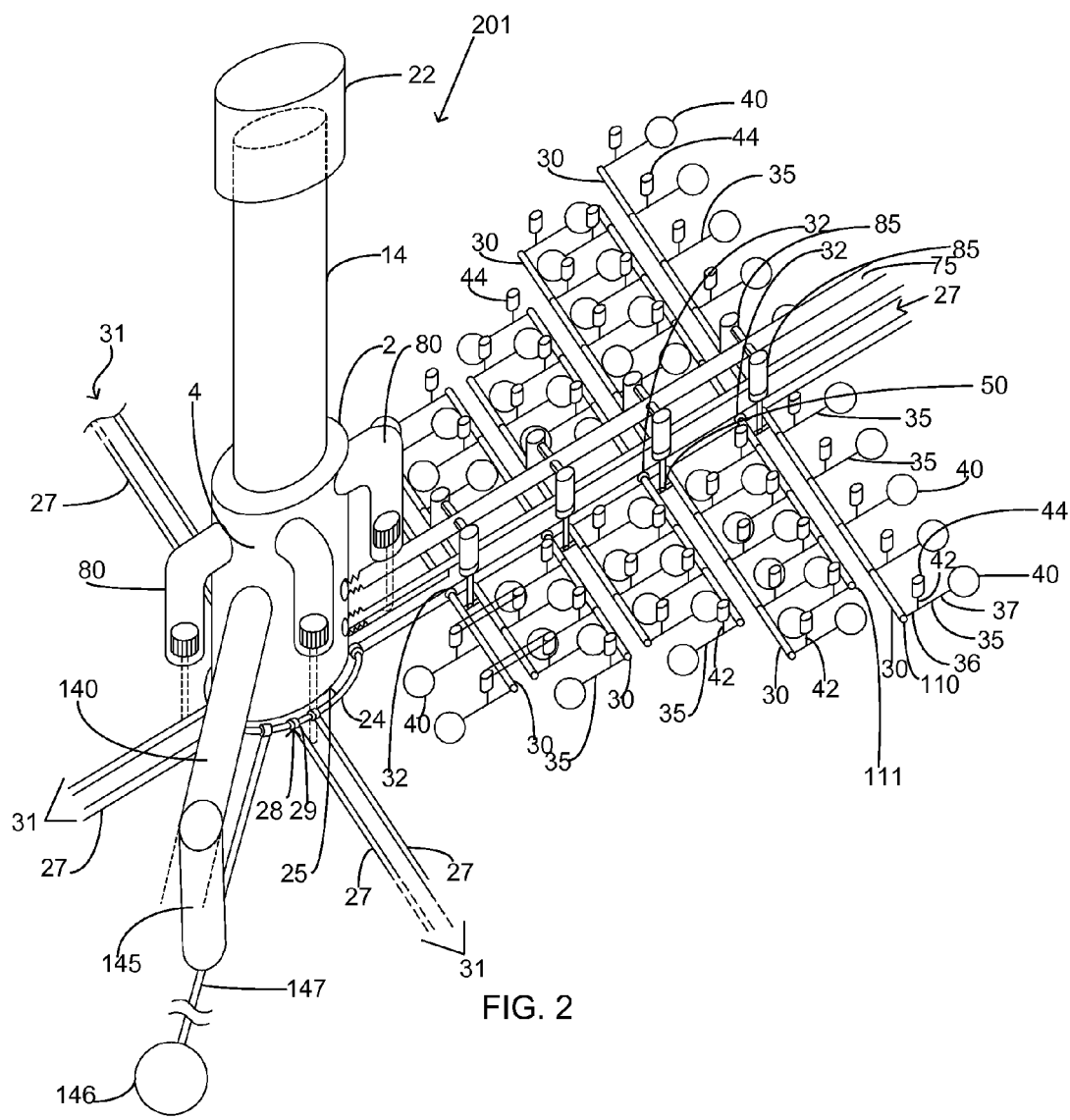
FIG. 2 is a schematic of the pistons and air collection pipes of the present invention.

As shown in particular in FIG. 2, a support ring 24 is circumferentially mounted to the tank 2. The support ring 24 is manufactured from a suitable durable material such as but not limited to aluminum and is mounted to the tank 2 utilizing conventional fasteners (not illustrated herein). The support ring 24 is mounted to the tank 2 such that a void 25 is present between the support ring 24 and the wall 4 of the tank 2. The void 25 allows the main support rod 27 connected at joint 28 sufficient room for a pivotal connection. Extending outward from the support ring 24 are a plurality of main support rods 27. The main support rods 27 are organized in parallel pairs 31 and are manufactured from a suitable durable material such as but not limited to corrosion resistant metal. The main support rods 27 are manufactured from a lightweight material and are generally hollow being sealed so as to increase their inherent buoyancy. The main support rods 27 are pivotally connected to the support ring 24 at joint 28 with fastener 29. Fastener 29 is generally surroundably mounted to the support ring 24 and is movably coupled thereto so as to allow an upwards-downwards movement of the main support rods 27. As discussed further herein, the main support rods 27 function to drive the third level air pumps 80. The main support rods 27 function to provide a structural support framework and are operably coupled with the plurality of secondary support rods 30. It is contemplated within the scope of the present invention that the main support rods 27 could be configured in numerous different lengths dependent upon the surface area of ocean that the wave powered energy conversion system 100 is configured to cover. In the preferred embodiment of the present invention, there are four parallel pairs 31 of the main support rods 27. The four parallel pairs 31 define quadrant areas 201. The drawings submitted herewith provide illustration of either one or a portion of the quandrant areas 201.

Extending generally perpendicular to the main support rods 27 are a plurality of secondary support rods 30. The secondary support rods 30 are movably coupled to the main support rods 27 at point 32 utilizing suitable durable techniques and are manufactured from a corrosion resistant material. Further the secondary rods 30 are lightweight, rigid and generally hollow being sealed in construction so as to increase their natural buoyancy. The secondary support rods 30 are manufactured to a desired length so as to provide sufficient length to allow a sufficient quantity of first level air pumps 90 to be operably coupled thereto in a particular quadrant area 201. It is contemplated within the scope of the invention that numerous different quantities of secondary support rods 30 could be operably coupled to the main support rods 27 so as to be configured for distribution across a desired surface area of the ocean.

Operably connected to the secondary support rods 30 are a plurality of lever arms 35. The lever arms 35 are movably mounted to the secondary support rods 30 and are generally perpendicular thereto. The lever arms 35 are manufactured from a suitable durable material and are movably coupled so as to allow an upwards-downwards movement thereof with respect to the secondary support rods 30. The lever arms 35 include a first end 36 and second end 37. Secured to the second end 37 of the lever arm 35 is a buoyant object 40. The buoyant object 40 is manufactured from a suitable durable material such as but not limited to plastic and has a positive buoyancy so as to maintain a position at the surface of the water level 1. The buoyant object 40 functions to move the lever arms 35 in an upwards-downwards motion as the water level undulates due to natural wave activity. As the lever arms 35 move in the aforementioned manner, the piston rod 42 is also moved in an upwards-downwards motion consistent with the lever arm 35.

The piston rod 42 is operably coupled to the lever arm 35 and secured thereto utilizing suitable durable techniques. The piston rod 42 is secured in a manner such that it is extending generally upward from the lever arm 35. The main support rods 27, secondary support rods 30 and lever arms 35 are operably connected as described herein and function to move in an upwards-downwards motion being driven by the buoyant objects 40 as a result of the natural undulating motion of ocean waves. The piston rod 42 is manufactured from a suitable durable material such as aluminum and is operably coupled to the piston 44 that is disposed within the first level air pump 90. FIG. 2 herein illustrates the lever arm 35, piston rod 42 and piston 44 without the first level air pump 90 in order to provide views thereof. FIG. 4 submitted herewith illustrates the piston rod 42 and piston 44 wherein the piston 44 is disposed within the first level air pump 90 and further illustrates the air collection pipe 70 operably coupled therewith. The first level air pump 90 is manufactured from a suitable durable material and is generally cylindrical in shape have a wall 91 forming an interior volume 92. The first level air pump 90 is a conventional air pump and operates such that the reciprocating movement of the piston 44 within the interior volume 92 pressurizes the interior volume 92 and the pressurized air is subsequently transferred to the passage 69 of the air collection pipe 70 for distribution to the tank 2 thus increasing the air pressure within the tank 2.

Each of the buoyant objects 40 is independently movable with respect to the adjacent buoyant object 40. As each buoyant object 40 moves on the surface of the water level 1 the lever arm 35 is reciprocated so as to further reciprocate the piston rod 42 driving the piston 44 disposed within the first level air pump 90. As the first level air pump 90 is operated, pressurized air is delivered to the tank 2 via the air collection pipe 70. The air collection pipe 70 is a conventional hollow pipe that delivers the pressurized air to the tank 2. The air collection pipe 70 is flexibly coupled to the tank 2 so as to ensure consistent engagement therewith in the event of any movement of the air collection pipe 70. The independently movable configuration of each lever arm 35 allows relatively small movements, i.e. smaller ocean waves that may or may not be present in all of the quadrant areas 201, to be utilized to drive the first level pumps 90 so as to capture the energy of the smaller waves and operate the first level air pumps 90 to create pressurized air delivery to the tank 2. Additionally, support braces 298 are secured intermediate the air collection pipe 70 and main support rod 27. The support braces 298 function to provide structural rigidity and a resistive force that allows the buoyant object 40 to move the lever arm 35 in a manner that effectively moves the piston 44 within first level air pumps 90. This configuration inhibits the air collection duct 70 from moving in sync with the main support rod 27 in an upward direction, which would negate the amount of travel of the piston 44 within the first level air pump 90. The support braces 298 are manufactured from a suitable durable material such as but not limited to metal tubing and/or metal rod. This configuration allows the wave powered energy conversion system 100 to capture wave motion that may only be present in a small area proximate thereto or when the natural ocean waves are smaller in size. It is contemplated within the scope of the present invention that any number of first level air pumps 90 could be present. Furthermore, it should be noted that FIG. 2, herein illustrates only an exemplary configuration of first level air pumps 90 and buoyant objects 40 and it is contemplated within the scope of the present invention that the first level air pumps 90 and buoyant objects could be configured such that they completely surround the tank 2 in the aforementioned quadrant areas 201.

Still referring to FIGS. 2 and 4, a plurality of second level air pumps 85 are present. The second level air pumps 85 have second level pistons 86 operably disposed therein that are moved in a reciprocating manner by the second level piston rod 87. The second level piston rod 87 is operably coupled to support rod 50. Support rod 50 is secured to adjacent secondary support rods 30 distal to the second level air pumps 85 and is generally perpendicular with respect to the adjacent secondary support rods 30. The second level air pumps 85 are driven by wave sizes that are larger than wave sizes that are operable to drive the first level pumps 90. By way of example but not limitation, as a wave engages the buoyant objects 40 attached to secondary support rods 110, 111 such that all of the buoyant objects 40 are lifted to a maximum height as allowed by the lever arms 35 this results in the upward movement of the secondary support rods 110, 111 thus providing operation of the second level air pump 85. The upwards-downwards movement of the secondary support rods 110, 111 causes the second level piston 86 to completely cycle within the second level air pump 85 so as to create pressurized air. This configuration allows the wave powered energy conversion system 100 to utilize large waves to drive the plurality of second level air pumps 85. While the second level air pumps 85 are illustrated herein as being operably coupled to support rod 50 so as to be operably connected to adjacent secondary support rods 30, it is contemplated within the scope of the present invention that the wave powered energy conversion system 100 could be configured with second level air pumps 85 such that each second level air pump 85 is operably coupled to one secondary support rod 30. Additionally, it is further contemplated within the scope of the present invention that any quantity of second level air pumps 85 could be present. Similarly to the first level air pumps 90, the second level air pumps 85 are operably coupled to a second air collection pipe 75 so as to distribute the pressurized air generated by the second level air pumps 85 to the tank 2 in order to further increase the air pressure within the tank 2. The second air collection pipe 75 is flexibly coupled to the tank 2 proximate end 74. This flexible coupling allows for maintenance of a secured connection despite any possible movement of the second air collection pipe 75.

Still referring to FIGS. 2 and 4, the wave powered energy conversion system 100 further includes a plurality of third level air pumps 80. The third level air pumps 80 are operably coupled with the tank 2 via duct 88 and as described herein for the first level air pumps 90 and second level air pumps 85 function to provide increased air pressure within the tank 2. The third level air pumps 80 include piston 81 and piston rod 82 wherein the piston rod 82 is operably coupled to the main support rod 27. The third level air pumps 80 are designed to capture the energy of a wave that exceeds the limitations of the first level air pump 90 and second level air pump 85. If a wave size is present such that all of the buoyant objects 40 in a exemplary quadrant area 201 are lifted generally simultaneously, the buoyant objects 40 in the quadrant area 201 move the main support rod 27 in an upwards-downwards motion as large waves cycle past the wave powered energy conversion system 100. As the buoyant objects 40 of an exemplary quadrant area 201 are all moved generally together by a larger wave, the third level air pump 80 generates pressurized air to be distributed to the tank 2 via duct 88 so as to increase the pressure within the tank 2. It is contemplated within the scope of the present invention that numerous different quantities of third level air pumps 80 could be present. It should further be recognized that the wave powered energy conversion system 100 could be adapted to utilize more than three categories of wave sizes. Additionally, it is contemplated within the scope of the present invention that the wave powered energy conversion system 100 could be configured in a manner wherein the transition between the levels of air pumps 199 could occur at various different wave height ranges. The configuration of the wave powered energy conversion system 100 as detailed herein facilitates the capture of waves relatively small in height, such as but not limited to twelve inches in height to wave sizes that are relatively large in height such as but not limited to seventy-two inches. The plurality of first level air pumps 90 facilitates the ability for sufficient pressure to be developed within the tank 2 even during relatively calm ocean conditions.

Figure 3:
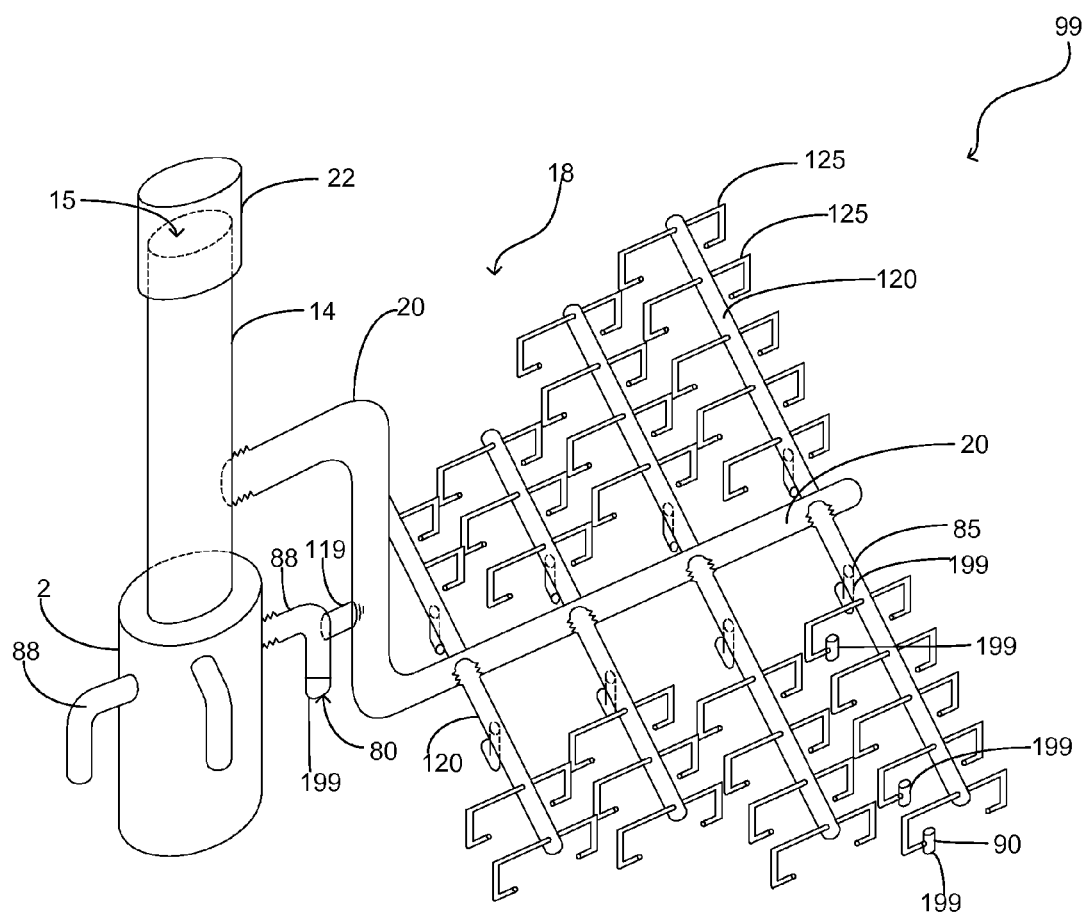
FIG. 3 is a schematic of the air supply pipes of the present invention.

Referring in particular to FIG. 3, the air supply pipe network 18 is illustrated therein. The air supply pipe network 18 is operable to supply air to the air pumps 199. The air supply pipe network 18 includes a main air supply pipe 20 that is operably coupled to the air tower 14. As previously mentioned herein, the air tower 14 is pneumatically isolated from the tank 2. Air enters the air supply pipe network 18 via opening 15 and flows through the main air supply pipe 20. The main air supply pipe 20 is operably coupled to the third level air pumps 80 via tube 119. Tube 119 is a conventional hollow tube having a passage that allows the transfer of air from the main air supply pipe 20 into the third level air pumps 80 where the air disposed therein can be pressurized and distributed to the tank 2. The main air supply pipe 20 additionally has operably coupled thereto a plurality of secondary air supply pipes 120. The secondary air supply pipes 120 function to provide airflow to the second level air pumps 85 so as to permit the second level air pump 85 to function as described herein. The secondary air supply pipes 120 extend generally perpendicular from the main air supply pipe 20 and function to further transport airflow to the tertiary air supply pipes 125. The tertiary air supply pipes 125 are operably coupled to the first level air pumps 90 and function to provide airflow thereto in order to permit the first level air pumps 90 to function as described herein. While the air supply pipe network 18 is illustrated as having a particular configuration herein, it is contemplated within the scope of the present invention that the air supply pipe network 18 could be configured in numerous different manners and achieve the desired functionality as described herein. While not illustrated herein, it is contemplated within the scope of the present invention that the air supply pipe network 18, air collection pipes 12 are isolated with conventional valves to ensure pneumatic isolation and to provide unidirectional airflow.

Illustrated in particular in FIG. 2, an air outlet pipe 140 is operably coupled to the tank 2. The air outlet pipe 140 is a conventional hollow pipe constructed of a suitable durable material. The air outlet pipe 140 functions to transfer the pressurized air stored within the tank 2 to a power-generating device such as but not limited to a turbine for electricity generation. While not illustrated herein, it is contemplated within the scope of the present invention that the air outlet pipe 140 is pneumatically isolated from the tank 2 with a conventional valve, wherein the valve functions to release the air within the tank 2 subsequent a pre-determined pressure having been achieved. A delivery air pump 145 is operably coupled to the air outlet pipe 140. The delivery air pump 145 functions to provide pressurized assistance in moving the airflow through the air outlet pipe 140. The delivery air pump 145 functions similarly to the air pumps 199 as described herein having a piston and a piston rod (not illustrated). The delivery air pump 145 is operably coupled to rod 147. Rod 147 is movably coupled to the support ring 24 and further includes a float 146 distal to the support ring 24. As described herein for the air pumps 199, the delivery air pump 145 provides additional air pressure to the air outlet pipe 140 so as to assist in the transfer of air through the air outlet pipe 145. While an air delivery pump 145 is illustrated herein, it is contemplated within the scope of the present invention that the wave powered energy conversion system 100 could be configured without the air delivery pump 145. Air is transferred via the air outlet pipe 140 to an alternate location or device such as a turbine generator for use in generating electrical power.

Referring to the drawings submitted herewith, a description of the operation of the wave powered energy conversion system is as follows. In use, the wave powered energy conversion system 100 would be positioned within an ocean adjacent to a coastal area. The support posts 10 are secured to the ocean floor utilizing suitable techniques. As the buoyant objects 40 traverse across the surface of the undulating movement of the waves of the ocean the air pumps 199 begin to pressurize the air stored within the tank 2. During the presence of small waves, the first level pumps 90 will operate independently of each other such that each lever arm 35 is moved in an upwards-downwards movement by the buoyant object operably coupled thereto. This provides operation of the first level air pumps 90. During the presence of waves of sufficient height such that all of the buoyant objects 40 operably coupled to a secondary support rod 30 are lifted simultaneously, the second level air pumps 85 are activated and generate air delivered via the air collection pipes to the tank 2 and provide increased air pressure within the tank 2. In the event of the presence of larger waves such that the wave height is sufficient to lift the buoyant objects 40 present in an exemplary quadrant area 201, the third level air pumps 80 are activated and provide air to the tank 2 via duct 88. Ensuing the tank 2 meeting or exceeding a predetermined air pressure, the air pressure is transferred to a power-generating device via the air outlet pipe 140.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A wave powered energy conversion system disposed in an oceanic environment operable to generate and store an air pressure that is greater than that of atmospheric pressure comprising:

a storage tank, said storage tank having at least one wall, a bottom and a top configured to define an interior volume that is hollow, wherein the interior volume is configured to store air at a pressure higher than atmospheric pressure;

at least one frame member, said at least one frame member extending outward from said storage tank being coupled thereto, said at least one frame member consisting of a first rod and a second rod, said first rod and said second rod being parallel, said first rod and said second rod being superposed the surface of the oceanic environment, said first rod and said second rod movable in a vertical manner;

a plurality of secondary frame members, said plurality of secondary frame members being consisting of a first arm and a second arm, said first arm and said second arm of said plurality of secondary frame members configured in a parallel manner, said plurality of secondary frame members being operably coupled with said at least one frame member extending outward therefrom, said plurality of secondary frame members being perpendicularly oriented with said at least one frame member, said plurality of secondary frame members being movable in an upwards-downwards direction;

a plurality of drive arms, said plurality of drive arms being operably coupled to said plurality of secondary frame members, said plurality of drive arms extending perpendicular from said plurality of secondary frame members, said plurality of drive arms having a first end and a second end, said plurality of drive arms further including a buoyant object proximate said second end, said plurality of drive arms operable to move in an upwards-downwards manner;

an air delivery pipe network, said air delivery pipe network consisting of a multitude of pipes, said pipes being cylindrical in shape having a hollow passage, said multitude of pipes being configured to be proximate said at least one frame member, said plurality of secondary frame members and said plurality of drive arms, said air delivery pipe network operable to distribute pressurized air to said storage tank;

a plurality of air pumps, said plurality of air pumps operably coupled to said air delivery pipe network, said plurality of air pumps operable to produce an increased air pressure into said air delivery pipe network, said plurality of air pumps further including a multitude of first level air pumps, said first level air pumps being operably coupled to said plurality of drive arms, said first level air pumps further including a chamber having a piston therein, said first level air pumps operably coupled with said air delivery pipe network, said plurality of air pumps further consisting of a plurality of secondary air pumps, said secondary air pumps being operably coupled to said plurality of secondary frame members, said secondary air pumps further being operably coupled to said air delivery pipe network, said plurality of air pumps additionally comprising at least one tertiary air pump, said at least one tertiary air pump being operably coupled to said at least one frame member, said at least one tertiary air pump being operably coupled to said air delivery pipe network; and wherein said buoyant objects are operable to move in an upwards-downwards motion in reaction to an ocean wave so as to drive at least one of said plurality of air pumps so as to produce an increased air pressure therefrom that is subsequently delivered to said storage tank thus increasing the air pressure within said storage tank.

2. The wave powered energy conversion system as recited in claim 1, and further including a support ring, said support ring being circumferentially mounted to said storage tank, said support ring being mounted such that a void is present intermediate said support ring and said storage tank, said support ring being operably coupled to said at least one frame member.

3. The wave powered energy conversion system as recited in claim 2, and further including an air supply pipe network, said air supply pipe network operably coupled to said plurality of air pumps, said air supply network operable to supply atmospheric air to said plurality of air pumps.

4. The wave powered energy conversion system as recited in claim 3, and further including an air intake, said air intake being superposed said storage tank and extending upward therefrom, said air intake operably coupled to said air supply network, said air intake being pneumatically isolated from said storage tank.

5. The wave powered energy conversion system as recited in claim 4, and further including a transfer pipe, said transfer pipe operably coupled to said storage tank, said transfer pipe operable to transfer pressurized air from said storage tank to an alternate location.

6. The wave powered energy conversion system as recited in claim 5, a transfer pipe air pump assembly, said transfer pipe air pump assembly further including a drive rod, said drive rod having a first end and a second end, said drive rod being operably coupled to said support ring proximate said first end, said drive rod further having a float secured proximate said second end, said transfer pipe air pump assembly operable to assist in the delivery of pressurized air from said storage tank to the alternate location.

7. The wave powered energy conversion system as recited in claim 6, wherein the wave powered energy conversion system is operable in a first mode, a second mode and a third mode, in said first mode said multitude of first level air pumps are independently operable to produce pressurized air as a result of said buoyant objects being moved by a small ocean wave, in said second mode said plurality of secondary air pumps being operable to produce pressurized air in response to said buoyant objects being moved by a wave of suitable size so as to move all of said buoyant objects operably coupled to said plurality of drive arms extending outward from at least one of said plurality of secondary frame members and in said third mode said at least one tertiary pump being operable to produce pressurized air as a result of aid buoyant objects being moved by a wave of sufficient size so as to upwardly move all of said buoyant objects operably coupled to said at least one frame member.

8. A wave powered energy conversion system operable to utilize the ocean waves to create an air pressure greater than that of atmospheric air wherein the pressurized air is transferred for consumption by an electric energy production device comprising:

a storage tank, said storage tank having at least one wall, a bottom and a top configured to define an interior volume that is hollow, wherein the interior volume is configured to store air at a pressure higher than atmospheric pressure, said storage tank being secured to a support platform, said support platform being secured to the ocean floor, said support platform operable to secure said storage tank in a position such that the bottom of said storage tank is proximate the level of the ocean water, four main frame assemblies, said four main frame assemblies each consisting of a pair of support rods, said pair of support rods consisting of a first rod and a second rod wherein said first rod and said second rod are parallel, said four main frame assemblies extending outward from said storage tank in opposing directions defining quadrant areas around said storage tank, said four main frame assemblies being movably in an upwards-downwards direction;

a plurality of secondary frame assemblies, said plurality of secondary frame assemblies consisting of a first member and a second member, said first member and said second member being parallel, said plurality of secondary frame assemblies extending outward from said first rod and said second rod of said four main frame assemblies and being perpendicular thereto, said plurality of secondary frame assemblies being operably coupled with said four main frame assemblies, said plurality of secondary frame assemblies being movable in an upwards-downwards direction;

a multitude of tertiary frame assemblies, said multitude of tertiary frame assemblies extending outward from each of said first member and said second member of said plurality of secondary frame assemblies, said multitude of tertiary frame assemblies being perpendicular to said plurality of secondary frame assemblies, said multitude of tertiary frame assemblies including a drive rod, said drive rod having a first end and a second end, said second end having secured thereto a buoyant object, said buoyant object operable to float on the surface of the ocean;

an air delivery pipe network, said air delivery pipe network consisting of a multitude of pipes, said pipes being cylindrical in shape having a hollow passage, said multitude of pipes being distributed through each of said quadrant areas surrounding said storage tank, said air delivery pipe network operable to distribute pressurized air to said storage tank;

a plurality of air pumps, said plurality of air pumps operably coupled to said air delivery pipe network, said plurality of air pumps operable to produce an increased air pressure into said air delivery pipe network for delivery into said storage tank, said plurality of air pumps further including a multitude of first level air pumps, said first level air pumps being operably coupled to said drive rods of said multitude of tertiary frame assemblies, said first level air pumps further including a chamber having a piston therein, said first level air pumps operably coupled with said air delivery pipe network, said plurality of air pumps further consisting of a plurality of secondary air pumps, said secondary air pumps being operably coupled to said first member and said second member of said plurality of secondary frame assemblies, said secondary air pumps further being operably coupled to said air delivery pipe network, said plurality of air pumps additionally comprising four tertiary air pumps, said four tertiary air pumps being operably coupled to said four main frame assemblies, said four tertiary air pumps being operably coupled to said storage tank; and wherein the wave powered energy conversion system is operable in a first mode, a second mode and a third mode as a result of different wave sizes engaging therewith.

9. The wave powered energy conversion system as recited in claim 8, wherein in said first mode said multitude of first level air pumps are independently operable to produce pressurized air as a result of said buoyant objects being moved by a small ocean wave, in said second mode said plurality of secondary air pumps being operable to produce pressurized air in response to said buoyant objects being moved by a wave of suitable size so as to move all of said buoyant objects operably coupled to one of said plurality of secondary frame assemblies in one quadrant area and in said third mode one of said four tertiary pumps being operable to produce pressurized air as a result of said buoyant objects present in one quadrant area being moved by a wave of sufficient size so as to upwardly move all of said buoyant objects in the one quadrant area.

10. The wave powered energy conversion system as recited in claim 9, and further including a support ring, said support ring being circumferentially mounted to said storage tank, said support ring being mounted such that a void is present intermediate said support ring and said storage tank, said support ring being operably coupled to said four main frame assemblies.

11. The wave powered energy conversion system as recited in claim 10, and further including an air supply pipe network, said air supply network consisting of a plurality of tubular hollow members, said tubular hollow members being dispersed within each quadrant area surrounding said storage tank, said air supply pipe network operably coupled to said plurality of air pumps, said air supply network operable to supply atmospheric air to said plurality of air pumps.

12. The wave powered energy conversion system as recited in claim 11, and further including a transfer pipe, said transfer pipe operably coupled to said storage tank, said transfer pipe operable to transfer pressurized air from said storage tank to an alternate location.

13. The wave powered energy conversion system as recited in claim 12, and further including an air intake, said air intake being superposed said storage tank and extending upward therefrom, said air intake operably coupled to said air supply network, said air intake being pneumatically isolated from said storage tank.

\* \* \* \* \*